(12) United States Patent
Gupta

(10) Patent No.: US 9,920,609 B2
(45) Date of Patent: Mar. 20, 2018

(54) METHOD OF RE-FRACTURING USING BORATED GALACTOMANNAN GUM

(71) Applicant: Baker Hughes, a GE company, LLC, Houston, TX (US)

(72) Inventor: D. V. Satyanarayana Gupta, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 279 days.

(21) Appl. No.: 14/165,427

(22) Filed: Jan. 27, 2014

(65) Prior Publication Data

US 2014/0138087 A1  May 22, 2014

Related U.S. Application Data

(63) Continuation-in-part of application No. 12/723,509, filed on Mar. 12, 2010, now Pat. No. 8,636,066.

(51) Int. Cl.
| | |
|---|---|
| E21B 43/26 | (2006.01) |
| C09K 8/68 | (2006.01) |
| C04B 26/28 | (2006.01) |
| C09K 8/44 | (2006.01) |
| C09K 8/512 | (2006.01) |
| C09K 8/514 | (2006.01) |
| C09K 8/516 | (2006.01) |
| C09K 8/88 | (2006.01) |
| C09K 8/90 | (2006.01) |

(52) U.S. Cl.
CPC ............ *E21B 43/261* (2013.01); *C04B 26/28* (2013.01); *C09K 8/44* (2013.01); *C09K 8/512* (2013.01); *C09K 8/514* (2013.01); *C09K 8/516* (2013.01); *C09K 8/887* (2013.01); *C09K 8/90* (2013.01); *C09K 2208/24* (2013.01)

(58) Field of Classification Search
CPC .......... E21B 33/13; E21B 33/12; E21B 43/26; E21B 43/261; C09K 8/685; C09K 8/68
See application file for complete search history.

(56) References Cited

U.S. PATENT DOCUMENTS

| | | |
|---|---|---|
| 2,868,664 A | 1/1959 | Goldstein |
| 3,766,984 A | 10/1973 | Nimerick |
| 3,794,115 A | 2/1974 | Skagerberg |
| (Continued) | | |

OTHER PUBLICATIONS

Y.N. Wei, K. Cheng, O.S. Ogueri, S.A. Holditch; "Determining the Best Diversion Method of Tight Gas Sand Stimulation"; SPE 126708; Feb. 2010; Society of Petroleum Engineers, US.

*Primary Examiner* — Catherine Loikith
(74) *Attorney, Agent, or Firm* — John Wilson Jones; Jones Delflache LLP

(57) ABSTRACT

A well treatment fluid containing borated galactomannan may be used to isolate a productive zone in a well having multiple productive zones. The fluid is particularly useful in treatment of wells containing a mechanical zonal isolation system in the productive zone of interest. The fluid is pumped into the well in a substantially non-hydrated form. The well treatment fluid is therefore highly effective in preferentially sealing or blocking productive zones in the formation since delayed hydration of the fluid may be controlled for up to several hours. The seal may be degraded and a productive zone subjected to re-fracturing by introducing a viscosity reducing agent into the well.

20 Claims, 7 Drawing Sheets

(56) References Cited

U.S. PATENT DOCUMENTS

| | | |
|---|---|---|
| 3,808,195 A | 4/1974 | Shelso et al. |
| 3,974,077 A | 8/1976 | Free |
| 4,378,049 A * | 3/1983 | Hsu .................. C08K 3/22 |
| | | 106/162.8 |
| 4,722,397 A | 2/1988 | Sydansk et al. |
| 5,055,209 A | 10/1991 | Bridges et al. |
| 5,067,566 A | 11/1991 | Dawson |
| 5,082,579 A | 1/1992 | Dawson |
| 5,145,590 A | 9/1992 | Dawson |
| 5,201,370 A | 4/1993 | Tjon-Joe-Pin |
| 5,226,479 A | 7/1993 | Gupta et al. |
| 5,226,481 A | 7/1993 | Le et al. |
| 5,252,234 A | 10/1993 | Sharif |
| 5,498,436 A | 3/1996 | Modliszewski et al. |
| 5,547,026 A | 8/1996 | Brannon et al. |
| 5,671,809 A | 9/1997 | McKinzie et al. |
| 5,806,597 A | 9/1998 | Tjon-Joe-Pin et al. |
| 6,006,838 A | 12/1999 | Whiteley et al. |
| 6,386,288 B1 | 5/2002 | Snider et al. |
| 6,508,305 B1 | 1/2003 | Brannon et al. |
| 7,138,446 B2 | 11/2006 | Reddy et al. |
| 7,268,101 B2 | 9/2007 | van Batenburg et al. |
| 7,347,265 B2 | 3/2008 | Monroe et al. |
| 7,404,437 B2 | 7/2008 | Brezinski et al. |
| 7,419,937 B2 | 9/2008 | Rimmer et al. |
| 7,472,753 B2 | 1/2009 | Mondelli et al. |
| 7,527,095 B2 | 5/2009 | Bloess et al. |
| 7,575,062 B2 | 8/2009 | East, Jr. |
| 7,669,655 B2 | 3/2010 | Brannon |
| 8,486,867 B2 | 7/2013 | Armstrong |
| 2002/0007949 A1 | 1/2002 | Tolman et al. |
| 2003/0006036 A1 | 1/2003 | Malone et al. |
| 2007/0173414 A1 | 7/2007 | Wilson, Jr. |
| 2007/0187098 A1 * | 8/2007 | Putzig .................. C09K 8/685 |
| | | 166/295 |
| 2008/0099203 A1 | 5/2008 | Mueller et al. |
| 2008/0156496 A1 | 7/2008 | East |
| 2008/0300149 A1 | 12/2008 | Reddy et al. |
| 2010/0096129 A1 * | 4/2010 | Hinkel .................. E21B 43/16 |
| | | 166/270.1 |
| 2010/0276150 A1 * | 11/2010 | Sullivan .................. C09K 8/508 |
| | | 166/305.1 |
| 2011/0220363 A1 | 9/2011 | Gupta et al. |
| 2013/0146291 A1 | 6/2013 | O'Malley |
| 2013/0186625 A1 | 7/2013 | O'Malley |
| 2013/0341030 A1 | 12/2013 | Brannon et al. |
| 2015/0041132 A1 | 2/2015 | Nelson et al. |
| 2015/0053397 A1 | 2/2015 | Filyukov et al. |
| 2015/0083420 A1 | 3/2015 | Gupta et al. |
| 2015/0144347 A1 | 5/2015 | Brannon et al. |
| 2015/0354334 A1 | 12/2015 | Richard et al. |
| 2016/0003021 A1 | 1/2016 | Nelson |

* cited by examiner

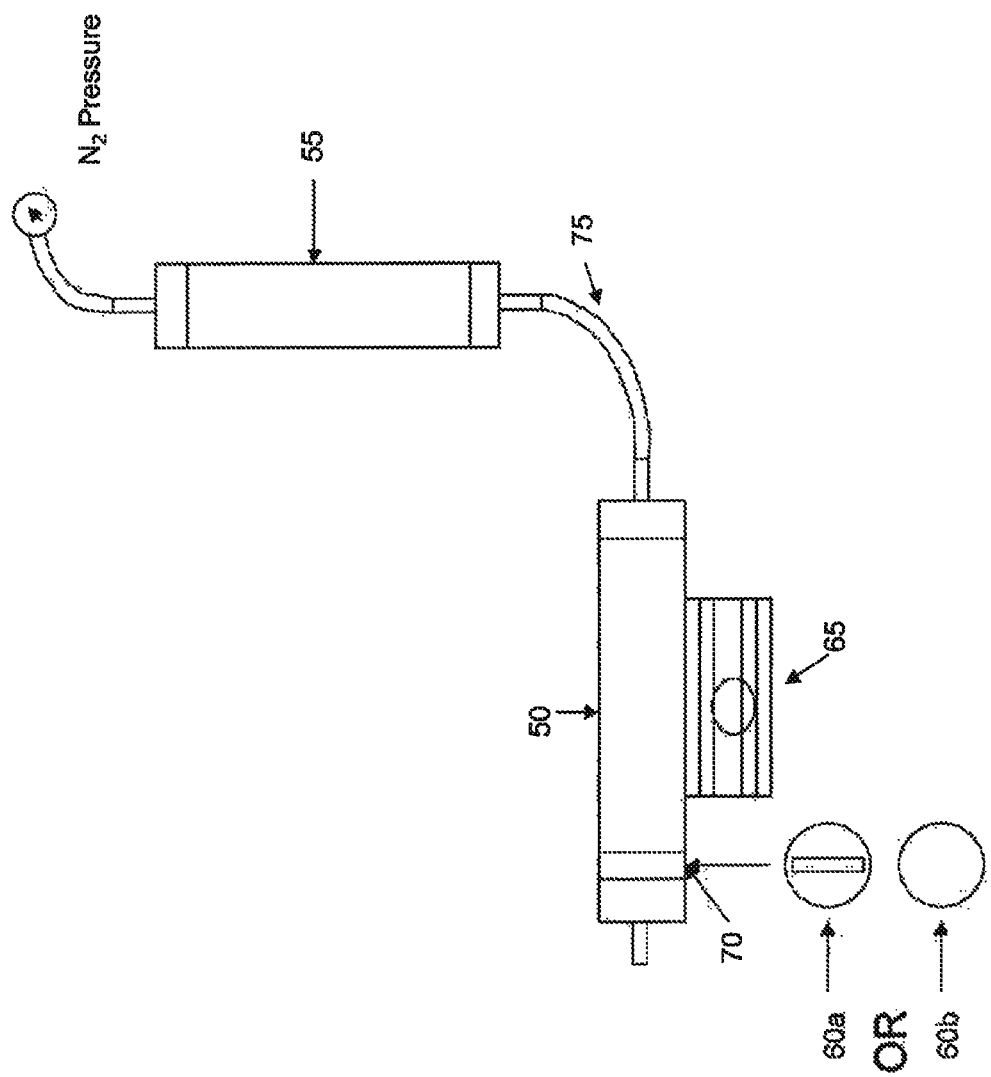

METHOD OF RE-FRACTURING USING BORATED GALACTOMANNAN GUM

This application is a continuation-in-part application of U.S. patent application Ser. No. 12/723,509, filed on 12 Mar. 2010, herein incorporated by reference.

FIELD OF THE INVENTION

The invention relates to the use of a well treatment fluid containing borated galactomannan gum as a temporary seal to effectuate zonal isolation between intervals of a wellbore as well as an alternative to cement. The invention further relates to a method of re-fracturing a subterranean formation wherein the temporary seal is removed from the well by exposing the temporary seal to a viscosity reducing agent.

BACKGROUND OF THE INVENTION

Typically, a subterranean formation penetrated by a well has a plurality of distinct zones or formations of interest. During production of fluids from the well, it usually is desirable to establish communication with only the zone or formations of interest such that stimulation treatments do not inadvertently flow into a non-productive zone or a zone of diminished interest. Selective stimulation (such as by hydraulic fracturing and acid stimulation) becomes pronounced as the life of the well declines and productivity of the well decreases.

Conventionally, selective stimulation was done by one or more perforating guns wherein the gun was conveyed on a wireline or tubing into the well and the gun was positioned adjacent to the zone and/or formation of interest and then selectively fired to perforate the zone and/or formation. The gun was then repositioned by the wireline to another zone or formation and the zone or formation of interest was then selectively perforated. This procedure was repeated until all of the zones and/or formations of interest were perforated; the perforating gun was then retrieved to the surface by means of the wireline. When fracturing was desired, the fracturing fluid was then pumped into the well under pressure exceeding the pressure at which the zone and/or formations would fracture. In order to prevent the fracturing fluid from flowing into zones having greater porosity and/or lower pressure, a mechanical device, such as a straddle packer, or plug or sand fill was first set in the well between the zone just fractured and the zone to be fractured to isolate the stimulated zone from further contact with the fracturing fluid. This procedure was repeated until all of the zones of interest were perforated and fractured.

Once the completion operation was finished, each plug had to be drilled out of or otherwise removed from the well to permit fluid to be produced to the surface through the well. The necessity of tripping in and out of the wellbore to perforate and stimulate each of the multiple zones and the use of such plugs to isolated previously treated zones and/or formations from further treatment fluid contact was both time consuming and expensive.

Various methods and assemblies have been reported for effectuating zonal isolation between intervals of the wellbore that did not depend on the removal of perforating equipment in and out of the well when completing multiple zones of interest. At the same time, such methods and assemblies isolated selected targeted productive intervals of the wellbore from non-productive intervals.

More recently, the use of isolation assemblies have been reported to provide zonal isolation and which allow for selected treatment of productive (or previously producing intervals) in multiple interval wellbores. For instance, U.S. Pat. No. 6,386,288 discloses a mechanical zonal isolation system which may be provided on the outside of the casing string (cemented to the wellbore) to permit an interval of the formation to be completed and stimulated and/or treated independent of the others. In this manner, selected intervals of the subterranean formation may be stimulated and/or treated. Such assemblies may include the use of flapper valve assemblies positioned between perforating gum assemblies.

See further, U.S. Pat. No. 7,575,062 which discloses an isolation assembly containing screen-wrapped sleeves and a plurality of swellable packers disposed in a liner and a tool within the liner for shilling openings fix the control of fluids from the wellbore.

Zonal isolation assemblies are expensive. When held in place by a cementitious slurry, such assemblies may only be removed from the wellbore by damaging or destroying the assembly. Alternative methods are further needed which will hold the casing in place in the wellbore.

In addition, alternatives have been sought for securing casing to the wellbore. Traditionally, cementitious slurries are used to cement the well pipe and casing to the wellbore. Typically, the slurry is pumped down the inside of the pipe or casing and back up the outside of the pipe or casing through the annular space between the exterior of the casing and the wellbore. The cement slurry is then allowed to set and harden to hold the casing in place. The use of conventional cementitious slurries is undesirable for use with zonal isolation assemblies since, in order to be removed from the well, damage to or destruction of the zonal isolation assembly becomes necessary.

Alternatives have also been sought for methods of re-fracturing a selectively stimulated formation having a plurality of distinct production zones. Re-fracturing is often desirable when a production zone within the well may not have been adequately fractured. This typically results in inadequate production from the production zone. Even if the formation was adequately fractured, the production zone may no longer be producing at adequate levels. Over an extended period of time, the production from a previously fractured horizontal wellbore may decrease below a minimum threshold level. One technique to increase the hydrocarbon production is the addition of new fractures within the subterranean formation.

SUMMARY OF THE INVENTION

The well treatment fluid described herein provides isolation during completion of a well and may be removed after or during post job flow-back. As a result, the well treatment fluid defined herein is capable of leaving the face of the formation virtually damage free after post fracturing production.

The well treatment fluid contains a borated galactomannan gum, crosslinking agent and preferably a breaker. The borated galactomannan, prior to being cured or hardened with the crosslinking agent, contains borate ions. The borated polygalactomannan may be pumped into a well which penetrates a formation unhydrated in water as a powder or as a hydrocarbon slurry.

Preferred galactomannans are guar gum and its derivatives, such as carboxymethyl ether derivatives and hydroxyalkyl ether derivatives. In addition, underivatized guar may also be preferred.

Hydration of the well treatment fluid may be controlled by adjusting the pH and/or a crosslinking agent, such as a heat delayed crosslinking agent. Thus, hydration of the well treatment fluid may be delayed until the fluid reaches its downhole destination. The well treatment fluid can therefore be effectively placed for preferentially sealing or blocking productive zones in the formation since delayed hydration of the fluid may be controlled for up to several hours.

The fluids are especially useful in the treatment of formations having multiple productive zones. Typically, the well to be treated contains a zonal isolation system in the zone of interest. The treatment fluid may be used in vertical as well as non-vertical wells. In such instances, the well may be perforated and then fractured without the use of any cement.

Thus, in an embodiment of the disclosure, a method of enhancing the productivity of a formation penetrated by a well is provided wherein an unhydrated borated galactomannan gum and a crosslinking agent is pumped into the well. The unhydrated borated galactomannan gum contains borate ions prior to being crosslinked or cured.

In another embodiment, a method of enhancing the productivity of a hydrocarbon-bearing formation penetrated by a well having multiple productive zones is provided. In the method, an unhydrated borated galactomannan gum and a crosslinking agent are introduced near a pre-determined productive zone of the well; the borate ions being incorporated into the unhydrated borated galactomannan gum prior to being crosslinked. The pre-determined productive zone is isolated from the other zones of the well by hardening the well treatment fluid. The isolated pre-determined productive zone is then perforated. The perforated pre-determined productive zone of the well is then hydraulically fractured by introducing into the perforated pre-determined productive zone a fracturing fluid at a pressure sufficient to fracture the perforated pre-determined productive zone.

In another embodiment, a method of enhancing the productivity of a hydrocarbon-bearing formation penetrated by a cemented vertical well having a casing and multiple productive zones is disclosed. In this embodiment, the productive zone of the well is perforated. The perforated productive zone is then subjected to hydraulic fracturing by introducing into the perforated productive zone a fracturing fluid at a pressure sufficient to fracture the perforated productive zone. A well treatment fluid containing borated galactomannan gum and a crosslinking agent is then introduced into the casing above the fractured perforated productive zone; the borated galactomannan gum containing incorporated borate ions prior to being crosslinked. The treatment fluid is then hardened.

In another embodiment, a method of enhancing the productivity of a hydrocarbon-bearing subterranean formation is provided. In this method, a well treatment fluid comprising an unhydrated borated guar and a crosslinking agent is introduced into an annulus between a wall of the wellbore and a pipe string disposed in the wellbore. The pipe string has disposed therein a zonal isolation assembly. The unhydrated borated guar, prior to being crosslinked, contains incorporated borate ions. The well treatment fluid is then hardened and a productive zone within the formation is isolated. The isolated productive zone is then perforated within the zonal isolation assembly. The isolated productive zone is then subjected to hydraulic fracturing by introducing into the zone a fracturing fluid at a pressure sufficient to fracture the isolated productive zone.

In another embodiment of the disclosure, a method of enhancing the productivity of a hydrocarbon-bearing subterranean formation penetrated by a non-vertical well is disclosed. In this embodiment, a first packer is introduced into the well. A zonal isolation assembly unit is introduced into the well adjacent to the first packer. A second packer is then introduced into the well until the area defined by the zonal isolation assembly unit is defined by first packer and the second packer. An unhydrated borated guar and a crosslinking agent is then introduced into the well. The unhydrated borated guar is then hardened. The unhydrated borate guar contains borate ions prior to hardening. The area defined by the first packer and second packer is then sealed from other areas of the well. The isolated zone is then subjected to hydraulic fracturing by introducing into the zone a fracturing fluid at a pressure sufficient to fracture the isolated zone. These steps may be repeated in another area of the well.

In another embodiment of the disclosure, a method of re-fracturing a subterranean formation penetrated by a well is provided. In this method, a viscosity reducing agent is pumped into the well. The viscosity of a gelled temporary seal is then reduced. The gelled temporary seal is a product of an unhydrated borated galactomannan gum and a crosslinking agent. The viscosity reducing agent is pumped into the well at a pressure insufficient to create or enlarge a fracture within the subterranean formation. A fracturing fluid is then pumped into the well at a pressure sufficient to create or enlarge a fracture within a pre-determined productive zone within the well.

In another embodiment is disclosed a method of re-fracturing a subterranean formation penetrated by a well wherein a previously fractured productive zone is isolated from another zone in the well by a temporary blocking gel. The temporary blocking gel is derived from a borated galactomannan gum. A viscosity reducing agent is pumped into the well at a pressure not sufficient to create or enlarge a fracture within the subterranean formation. The viscosity of the temporary blocking gel is reduced. The previously fractured productive zone may then be re-fractured by introducing into the previously fractured productive zone a fracturing fluid at a pressure sufficient to create or enlarge a fracture. A well treatment fluid comprising an unhydrated galactomannan gum is then introduced above the re-fractured productive zone. The re-fractured zone is then isolated by hardening the well treatment fluid.

In another embodiment, a method of enhancing the productivity of a hydrocarbon-bearing formation penetrated by a well having multiple productive zones is provided. In this method a well treatment fluid comprising a viscosity reducing agent is pumped into a previously fractured productive zone within the well. The previously fractured productive zone is isolated from a second productive zone of the well by a temporary blocking gel derived from a borated galactomannan gum. The viscosity of the temporary blocking agent may then be reduced and the temporary blocking agent removed from the well. The previously fractured productive zone may then be re-fractured by pumping a fracturing fluid into the well at a pressure sufficient to initiate or enlarge a fracture. A well treatment fluid comprising borated galactomannan gum may then be pumped into the well. The re-fractured productive zone may then be isolated from another productive zone within the well by hardening the well treatment fluid comprising the borated galactomannan gum.

BRIEF DESCRIPTION OF THE DRAWINGS

In order to more fully understand the drawings referred to in the detailed description of the present invention, a brief description of each drawing is presented, in which:

FIG. 7 illustrates the testing conditions used in the Examples.

DETAILED DESCRIPTION OF THE PREFERRED EMBODIMENTS

Figure 1:
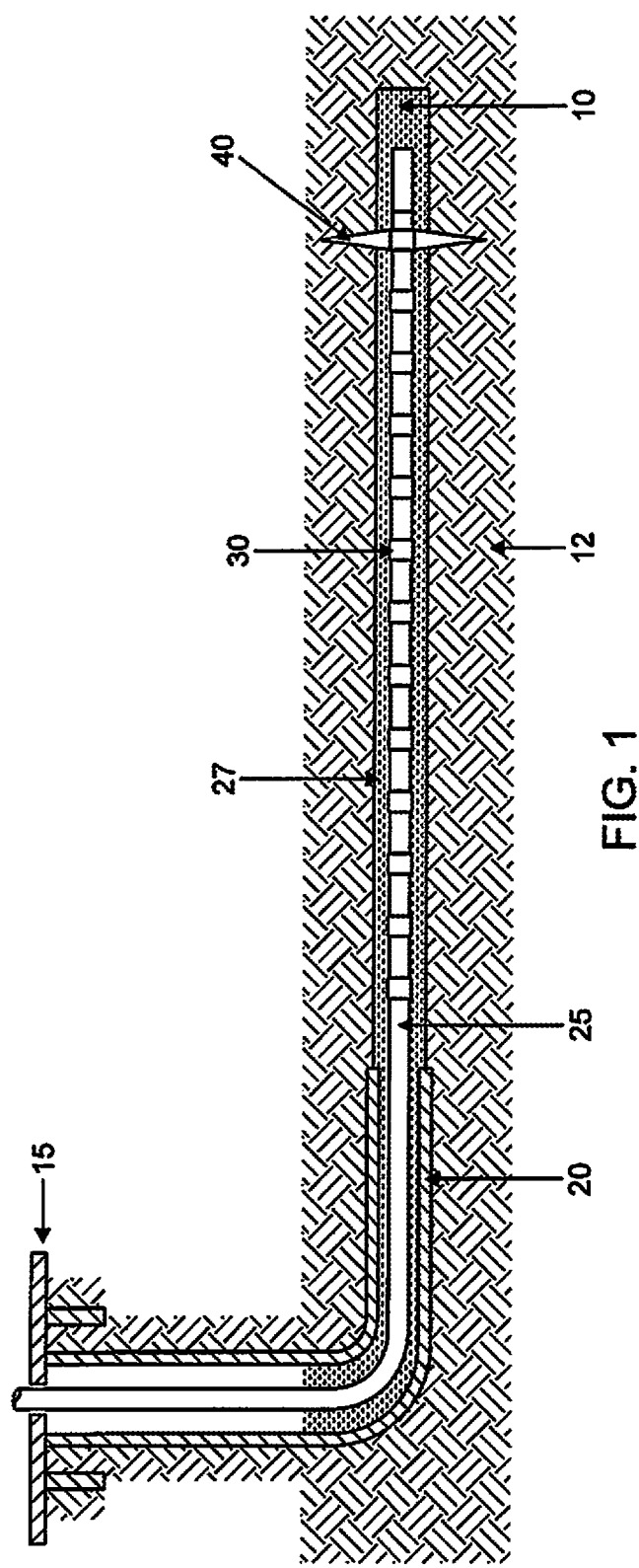
FIG. 1 illustrates the use of the well treatment fluid in a horizontal well which contains a zonal isolation system.

The borated galactomannan gum used in the well treatment fluids described herein are galactomannan gums which, prior to being crosslinked or cured, have incorporated borate ions. Such borated galactomannan gums are disclosed in U.S. Pat. No. 3,808,195, herein incorporated by reference. The borated polygalactomannan may be prepared by introducing the galactomannan to a material containing a borate ion, i.e., a material which can contribute a borate ion to the reaction.

Unhydrated borated galactomannan may be pumped as a powder or as a slurry either in water or in mineral oil added to water. Typically, the amount of borated galactomannan pumped into the formation is between from about 100 pounds per thousand gallons of water (ppt) to about 1000 ppt, preferably from about 250 ppt to about 750 ppt. When a hydrocarbon slurry is used, the amount of borated galactomannan in the slurry is between from about 3 pounds per gallon of hydrocarbon to 5 pounds per gallon of hydrocarbon.

Preferred galactomannans for use in the invention are guar gum and its derivatives, including natural or underivatized guar, enzyme treated guar gum (having been obtained by treating natural guar gum with galactosidase, mannosidase, or another enzyme) and derivatized guar. The derivatives of polygalactomannans include the water soluble derivatives such as carboxyalkyl ethers, for example, carboxymethyl ether derivatives, hydroxyalkyl ether derivatives such as hydroxyethyl ethers and hydroxypropyl ethers of polygalactomannan, carbamylethyl ethers of polygalactomannan; cationic polygalactomannans and depolymerized polygalactomannans.

Further, suitable derivatized guars are those prepared by treating natural guar gum with chemicals to introduce carboxyl groups, hydroxyl alkyl groups, sulfate groups, phosphate groups, etc. Preferred are or a hydroxyalkylated guar (such as hydroxypropyl guar, hydroxyethyl guar, hydroxybutyl guar) or modified hydroxyalkylated guars like carboxylated guars such as carboxyalkylated guars, like carboxy methyl guar as well as carboxylated alkylated hydroxyalkyl guars, such as carboxymethyl hydroxypropyl guar (CMHPG), including those having a molecular weight of about 1 to about 3 million. The carboxyl content of the such guar derivatives may be expressed as Degree of Substitution ("DS") and ranges from about 0.08 to about 0.18 and the hydroxypropyl content may be expressed as Molar Substitution (MS) (defined as the number of moles of hydroxyalkyl groups per mole of anhydroglucose) and ranges between from about 0.2 to about 0.6.

Generally, the borated galactomannan is prepared by soaking polygalactomannan in an alkaline water solution of a material containing borate ions, allowing the polygalactomannan to absorb all of the solution and then milling and drying the polygalactomannan. The amount of water in the alkaline water solution is about equal to the amount of polygalactomannan. The solution is made alkaline with alkali metal or alkaline earth metal hydroxide. The concentration of the alkali metal or alkaline earth metal hydroxide in the solution is about 0.3% to 0.5% by weight based on the weight of the polygalactomannan. After the polygalactomannan is absorbed, it is milled and dried at temperature generally between from about 150° C. to about 250° C. to about the original moisture level of untreated polygalactomannan, generally containing about 9% to 12% water by weight. Further processes of preparing the borated polygalactomannan and its derivatives are set forth in U.S. Pat. No. 3,808,195.

Preferred as the material containing a borate ion are alkali metal, alkaline earth metal and ammonium salts of borate anions. Borate anions include the tetraborate, metaborate and perborate anions. Assuming the molecular weight of the galactomannan unit as 200, the substituting groups are in a 0.1 molar to 3 molar ratio in the reaction mixtures producing molar substitution of at least 0.1. The molar substitution is the average number of substituting radical substituted per mole of anhydrohexose unit of polygalactomannan gum. The concentration of borate ion is expressed as borax, $Na_2B_4O_7.10H_2O$.

Borated guars, prepared from the reaction of the borate ion and polygalactomannan gum, are dispersible in water and exhibit a limited ability to be crosslinked when the polygalactomannan is hydrated and the pH of the resulting sol is alkaline. Generally, the polygalactomannan will disperse in water at the same pH level as the untreated polymer. Since the rate of hydration of the borated polygalactomannan is greatest at nearly neutral or acidic pH conditions, the borated polygalactomannan does not hydrate at higher pH values. Because the well treatment fluid is pumped at most only best partially hydrated into the formation, it has a low viscosity which minimizes friction pressures and which allows placement of the well treatment fluid, such as at low pump rates or with coiled tubing.

By controlling hydration by adjusting the pH, such as with a pH adjustment agent, and then crosslinking the borated polygalactomannan (preferably with an additional crosslinking agent), viscosity of the well treatment fluid may be controlled and maintained at a desired temperature. Suitable pH adjustment agents include soda ash, potassium hydroxide, sodium hydroxide and alkaline and alkali carbonates and bicarbonates, may be used to maintained the desired pH. Typical the desired pH for hardening of the well treatment fluid is greater than 8.0, more preferably greater than 9.0.

The well treatment fluid is therefore highly effective in preferentially sealing or blocking productive zones in the formation since delayed hydration of the fluid may be controlled for up to several hours by the amount of borate used on the guar or guar derivative, as well as the pH of the system. For instance, the viscosity of the fluid may be decreased, typically by use of pH or temperature controlled breakers, when the passive isolation of the zones is no longer desired. By adjusting the pH to highly basic conditions, crosslinking of the borated polygalactomannan may further be delayed to high temperatures, for example, up to 120° F.; and often to as high as 350° F.

Thus, the crosslinking agent used in the fluid of the invention is typically a delayed crosslinking agent (in order to delay hydration of the polygalactomannan), though other crosslinking agents may be used. In many instances, hydration may be controlled for up to 24 to 36 hours prior to forming a gel of sufficient viscosity to function as a sealant.

Especially at high temperatures, the crosslinking agent is borax. In addition to borax other borate ion releasing compounds may be used as well as organometallic or organic complexed metal ions comprising at least one transition metal or alkaline earth metal ion as well as mixtures thereof.

Borate ion releasing compounds which can be employed include, for example, any boron compound which will supply borate ions in the composition, for example, boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. An example of a suitable polymeric borate compound is a polymeric compound of boric acid and an alkali borate which is commercially available under the trademark POLYBOR® from U.S. Borax of Valencia, Calif. Mixtures of any of the referenced borate ion releasing compounds may further be employed. Such borate-releasers typically require a basic pH (e.g., 8.0 to 12) for crosslinking to occur.

Further preferred crosslinking agents are reagents, such as organometallic and organic complexed metal compounds, which can supply zirconium IV ions such as, for example, zirconium lactate, zirconium lactate triethanolamine, zirconium carbonate, zirconium acetylacetonate and zirconium diisopropylamine lactate; as well as compounds that can supply titanium IV ions such as, for example, titanium ammonium lactate, titanium triethanolamine, and titanium acetylacetonate. Zr (IV) and Ti (IV) may further be added directly as ions or oxy ions into the composition.

Such organometallic and organic complexed metal crosslinking agents containing titanium or zirconium in a +4 valence state include those disclosed in British Pat. No. 2,108,122, herein incorporated herein by reference, which are prepared by reacting zirconium tetraalkoxides with alkanolamines under essentially anhydrous conditions. Other zirconium and titanium crosslinking agents are described, for example, in U.S. Pat. No. 3,888,312; U.S. Pat. No. 3,301,723; U.S. Pat. No. 4,460,751; U.S. Pat. No. 4,477,360; Europe Pat. No. 92,755; and U.S. Pat. No. 4,780,223, all of which are herein incorporated by reference. Such organometallic and organic complexed metal crosslinking agents containing titanium or zirconium in a +4 oxidation valance state may contain one or more alkanolamine ligands such as ethanolamine (mono-, di- or triethanolamine) ligands, such as bis(triethanolamine)bis(isopropyl)-titanium (IV). Further, the compounds may be supplied as inorganic oxides, such as zirconium or titanium dioxide. Such crosslinking agents are typically used at a pH also in the range from about 6 to about 13.

Any suitable crosslinking metal ion, metal containing species, or mixture of such ions and species may further be employed. In a preferred embodiment, the crosslinking agent for use in the thermal insulating composition of the invention are reagents capable of providing Zn (II), calcium, magnesium, aluminum, Fe (II), and Fe (III) to the composition. These may be applied directly to the composition as ions or as polyvalent metallic compounds such as hydroxides and chlorides from which the ions may be released.

The crosslinking ions or species may be provided, as indicated, by dissolving into the solution compounds containing the appropriate metals or the metal ion per se. The concentration of crosslinking agent is dependent on factors such as polymer concentration and the temperature in the annuli and will normally range from about 5 ppm to about 2000 ppm, preferably from about 100 ppm to about 900 ppm. It is an important advantage of the invention that higher levels of the crosslinking metal ion or metal containing species may be employed, thereby insuring improved crosslinking.

Well treatment fluids containing the borated galactomannan gum have particular applicability in the treatment of formations where multiple productive zones are known to be present. For instance, in certain formations, such as shale, it may be desired to frac the formation in numerous stages, between from 6 to 40 stages. The well treatment fluid may function as an isolation system for several hours up to several days. The treatment fluid may be used in vertical as well as non-vertical wells, most notably horizontal wells.

The well treatment fluid has particular applicability for use as passive chemical annular isolation systems to isolate zones of interest for stimulation. The fluid may be introduced into a well having a casing lining or into an open hole.

The well treatment fluid defined herein has particular applicability when used in conjunction with a mechanical zonal isolation system. In such methods, it is usually desired to perforate and fracture the isolated zone without the use of any cement.

As shown in FIG. 1, a horizontal well 10 penetrating formation 12 and having surface casing 15 and intermediary string 20 is equipped with piping 25 and mechanical zonal isolation assembly 30. The well treatment fluid 27 is introduced into the wellbore and fills the space between piping 25 and casing 15. Once the fluid is hardened, string 20 at a desired location is perforated and formation 12 then is subjected to hydraulic fracturing wherein fractures 40 are created. After fracturing is completed, viscosity of the fluid is broken by interaction of a breaker. After the fluid is removed from the well, intermediary string 20, piping 25 and mechanical zonal isolation assembly 30 may further be removed from the well.

In another embodiment, a productive zone of a well having multiple productive zones may be first perforated. A fracturing fluid may then be introduced into the perforated productive zone at a pressure sufficient to fracture the perforated productive zone. The well treatment fluid defined herein may then be introduced into the fractured perforated productive zone. The perforated productive zone may then be isolated by hardening the well treatment fluid. If desired, another productive zone of the well may be perforated and the process repeated. This procedure is typically done by cementing a vertical well to the annulus prior to perforation of the first zone. In addition, one or more of the productive zones may contain a zonal isolation assembly as previously described.

In another embodiment of the invention, the well treatment fluid described herein may be introduced into a pre-determined productive zone of a well containing multiple productive zones. The fluid in the pre-determined productive zone is then hardened, thereby isolating the pre-determined productive zone from the other zones of the well. The zone may then be perforated the zone may then be subjected to hydraulic fracturing since the zone of interest is sealed from other zones.

The treatment fluid may further be used in a method which also uses a mechanical device, such as a packer, plug or sand fill. Such mechanical devices may be first set in the well between a zone to be fractured and an adjacent zone of the well. This method is more practical for use in non-vertical wells. A zonal isolation assembly unit may be present in one or more of the zones to be fractured, the area defined by the two packers containing the zonal isolation assembly unit. The well treatment fluid defined herein may then be introduced into the well. Upon hardening of the well treatment fluid, the area between the first and second packers is sealed off of other zones within the well. The sealed area may then be subjected to fracturing. The process may then be repeated over successive periods in order to fracture other zones of interest within the well. After the gel defining the fluid of the well treatment fluid is broken, any zonal isolation system may be removed from the well.

Along with providing effective zonal isolation following stimulation, the well treatment fluid further minimizes cementing of natural fractures. When conventional cements are used within the wellbore, it is not uncommon for the cement to enter into natural fractures following drilling and/or perforation of the formation. This causes clogging of the natural fractures. As an alternative to cement, the well treatment fluid defined herein may be used in place of, or in addition to, cement.

In such instances, a fluid containing a slurry of the borated galactomannan may be introduced into a slurry of the fluid may be introduced into the annulus of the well between a wall of the wellbore and a pipe string disposed in the wellbore. In a preferred embodiment, the pipe string has disposed therein a zonal isolation assembly. In such instances, after the fluid is hardened, an isolated productive zone within the zonal isolation assembly may then be perforated. The zonal isolation assembly may be multi-interval fracture treatment isolation assembly, such as that known in the prior art, including that type of assembly disclosed in U.S. Pat. No. 6,386,288. The well may then be subject to hydraulic fracturing at a pressure which is sufficient to fracture the isolated productive zone. In such instances, the well may be a non-vertical well.

In an alternative embodiment, the well contains only tubing and does not contain a casing. The mechanical isolation assembly is joined to the tubing.

The fluid provides passive zonal isolation in that the borated galactomannan may be removed from the well by breaking of the gel. The fluid may therefore be used in place of a mechanical packer. The passive zonal isolation methods described herein therefore provide for annular isolation, like conventional cements, without damaging the formation. Thus, in a preferred mode of operation, the annular isolation system provided by the crosslinked gel exits the well during post job flow-back operations, leaving the formation face virtually damage free for post frac production.

The well treatment fluids defined herein are particularly effective in those applications where re-fracturing the formation may be ultimately desired. A seal containing the borated galactomannan gum may be broken and the borated galactomannan gum removed from the well by introducing into the well a viscosity reducing agent. The viscosity reducing agent at least partially degrades the gelled borated galactomannan gum and the borated galactomannan gum becomes less viscous and thus removable from the well. As such, seals which isolate a fractured productive zone from another zone within the formation with a borated galactomannan gum as defined herein may be removed from the well such that the formerly isolated productive zone may be subjected again to a fracturing operation.

The fluid containing the viscosity reducing agent is pumped into the well at a pressure which is insufficient to create or enlarge a fracture within the formation. Thus, after the seal has been degraded (and the borated galactomannan gum preferably is removed from the well), a fracturing fluid may be pumped into the well at a pressure sufficient to create or enlarge a fracture within the formation. In this manner, a previously fractured productive zone within the formation may be subjected to hydraulic fracturing.

Typically, the formation is re-fractured by pumping the fracturing fluid into a pre-determined productive zone of a well that has been previously fractured or was attempted to be fractured and which contains multiple productive zones. Thus, for example, a location of a formation of a multizone wellbore may be re-fractured by hydraulically isolating a first location from a portion of the multizone wellbore uphole from the first location, the first location having been previously hydraulically fractured at least once and hydraulically re-fracturing the first location. After the formation is re-fractured, a well treatment fluid containing an unhydrated galactomannan gum may be introduced into the well as described herein and the re-fractured zone isolated by hardening the well treatment fluid.

It will be understood that the method of re-fracturing may consist of multiple re-fracturing operations wherein a fluid containing the viscosity reducing agent is introduced into the well and the temporary seal blocking a productive zone from another zone within the formation is removed, the formation is subjected to fracturing, a fluid containing the borated galactomannan gum is introduced into the well and hardened to isolate the re-fractured productive zone from other productive zones within the formation and the process then repeated.

Suitable viscosity reducing agents include any material(s) suitable for imparting viscosity reduction characteristics to the borated galactomannan gum fluid. Examples of suitable materials include, but are not limited to, oxidizing agents (such as sodium bromate), amines, acids, acid salts, acid-producing materials, enzyme breakers, encapsulated breakers, etc., and combinations thereof. The viscosity reducing agents facilitate the degradation of the borated galactomannan gum in the well treatment fluid, whereby the degraded fluid may be removed from the subterranean formation to the well surface.

Suitable acids include hydrochloric acid, formic acid or sulfamic acid as well as acid salts, such as sodium bisulfate.

Suitable oxidizing agents include alkaline earth and metal peroxides (like magnesium peroxide, calcium peroxide and zinc peroxide), organic peroxides, hydrochlorite bleaches, persulfate salts (used either as is or encapsulated) such as ammonium persulfate, sodium persulfate, ammonium peroxydisulfate and potassium persulfate, chromous salts, sodium bromate, sodium perchlorate, sodium perborate, magnesium perborate, calcium perborate, etc.

Enzyme breakers capable of breaking the backbone of the crosslinked gel into monosaccharide and disaccharide fragments, such as galactomannases, may also be used.

The viscosity reducing agent is introduced into the well in an amount sufficient to at least partially degrade the borated galactomannan gum such that the temporary seal isolating the previously fractured productive zone may be removed.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

The following materials are used in the examples below:
Polymer refers to borated guar, commercially available from Baker Hughes Incorporated as GW-26.
Borax is used as the delay hydration additive (which also acts as a cross-linking agent).
GBW-25, a breaker, is sodium bromate, commercially available from Baker Hughes Incorporated.
Viscosity was measured using a Chandler high pressure high temperature (HPHT) 5550 viscometer.

Example 1

Figure 2:
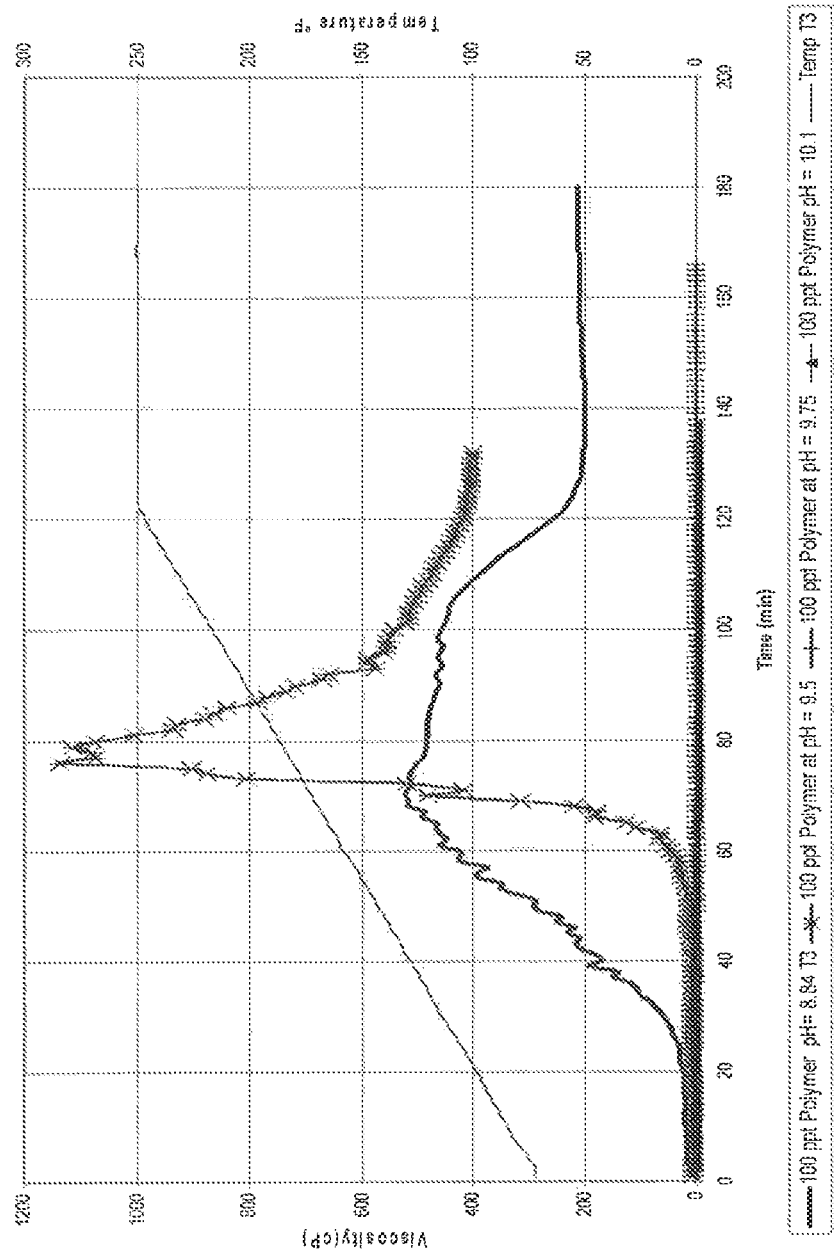
FIG. 2 illustrates the effect of varying levels of pH on the start of gel hydration.

The effect of varying levels of pH on the start of gel hydration was tested using viscosity measurements. The results are set forth in FIG. 2. For each test run, the gel was created using 100 ppt Polymer in water. This slurry had a pH of 8.84. The pH was increased with a sodium hydroxide solution (10% by weight in water) to values of 9.5, 9.75 and 10.1. The slurry was loaded in to the viscometer and viscosity measured at a shear rate of 100 sec-1. The temperature of the viscometer was ramped from 70° F. to 250° F. in two hours and was then kept constant at 250° F. for an additional hour. FIG. 2 demonstrates that pH affects the viscosity in the following manner:
  a. pH higher than 9.75 caused the gel not to hydrate and become viscous at all;
  b. at a pH of 9.5, the gel's viscosity starts to increase after 60-65 minutes, but the viscosity was short lived; and
  c. at a pH of 8.84, the gel's viscosity starts to increase after 30 minutes, much like its performance at room temperature in tap water.
FIG. 2 further shows that the start time of hydration may be controlled by pH.

Example 2

Figure 3:
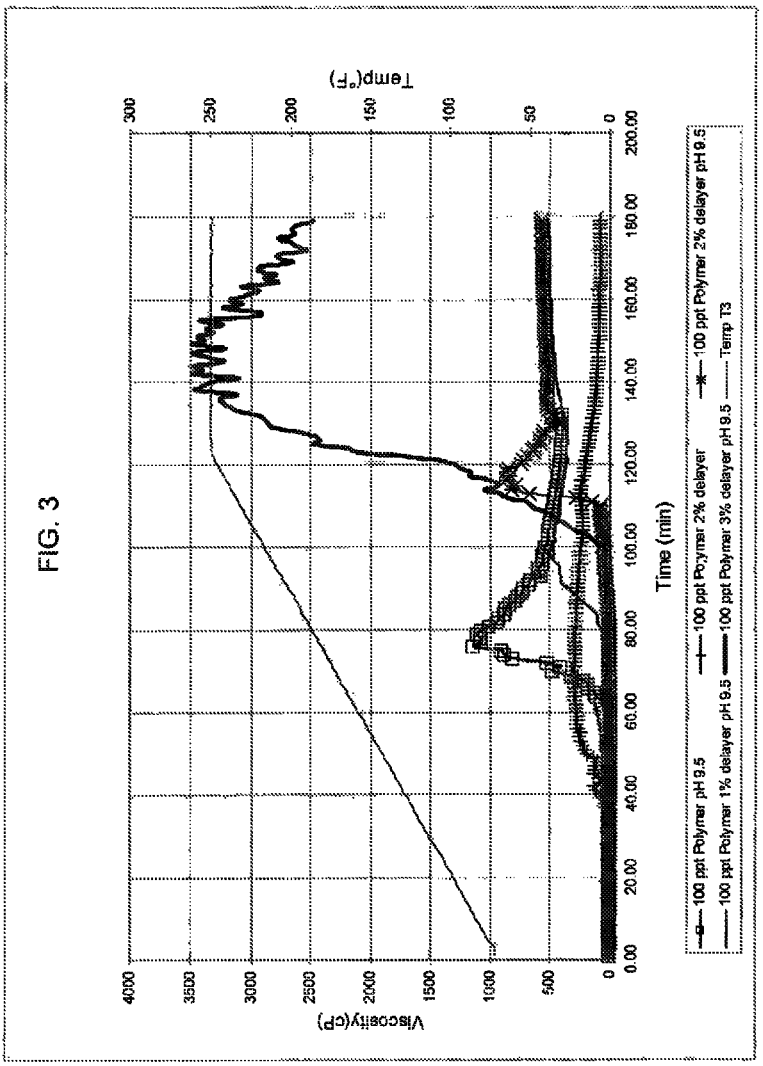
FIG. 3 illustrates the effect of a delayer on the start of gel hydration.

Using the above procedure, the effect of adding borax as a delayer while maintaining a pH of 9.5 was examined. The results are set forth in FIG. 3. For each run, the gel was created using 100 ppt Polymer in water and sodium hydroxide solution to adjust the pH. Borax was added in 1%, 2%, 3% by weight of Polymer as a delaying agent. The slurry was loaded in to the viscometer and viscosity measured at a shear rate of 100 sec-1. The temperature of the viscometer was ramped from 70° F. to 250° F. in two hours and was then kept constant at 250° F. for an additional hour. The results show that borax by itself (without any pH adjustment) did little to delay hydration, however, when coupled with an increase of pH from 8.84 to 9.5, made a significant difference in slowing the hydration rate. Specifically:
  a. the control run of the gel at the natural pH of 8.84 and 2% Borax by weight of polymer showed little difference in hydration;
  b. the gel adjusted to a pH of 9.5 with 1% Borax by weight of polymer delayed hydration to about 80 minutes;
  c. the gel adjusted to a pH of 9.5 with a 2% Borax by weight of polymer delayed hydration to about 120 minutes; and
  d. the gel adjusted to a pH of 9.5 with a 3% Borax by weight of polymer delayed start of hydration to about 100 minutes, with complete hydration delayed to 140 minutes.
To further illustrate, the gel was adjusted to a pH of 9.5 from Example 1 was also included in FIG. 3. It is clear that the addition of a delayer along with an increase of pH to 9.5 enables a greater control of the time hydration starts.

Example 3

Figure 4:
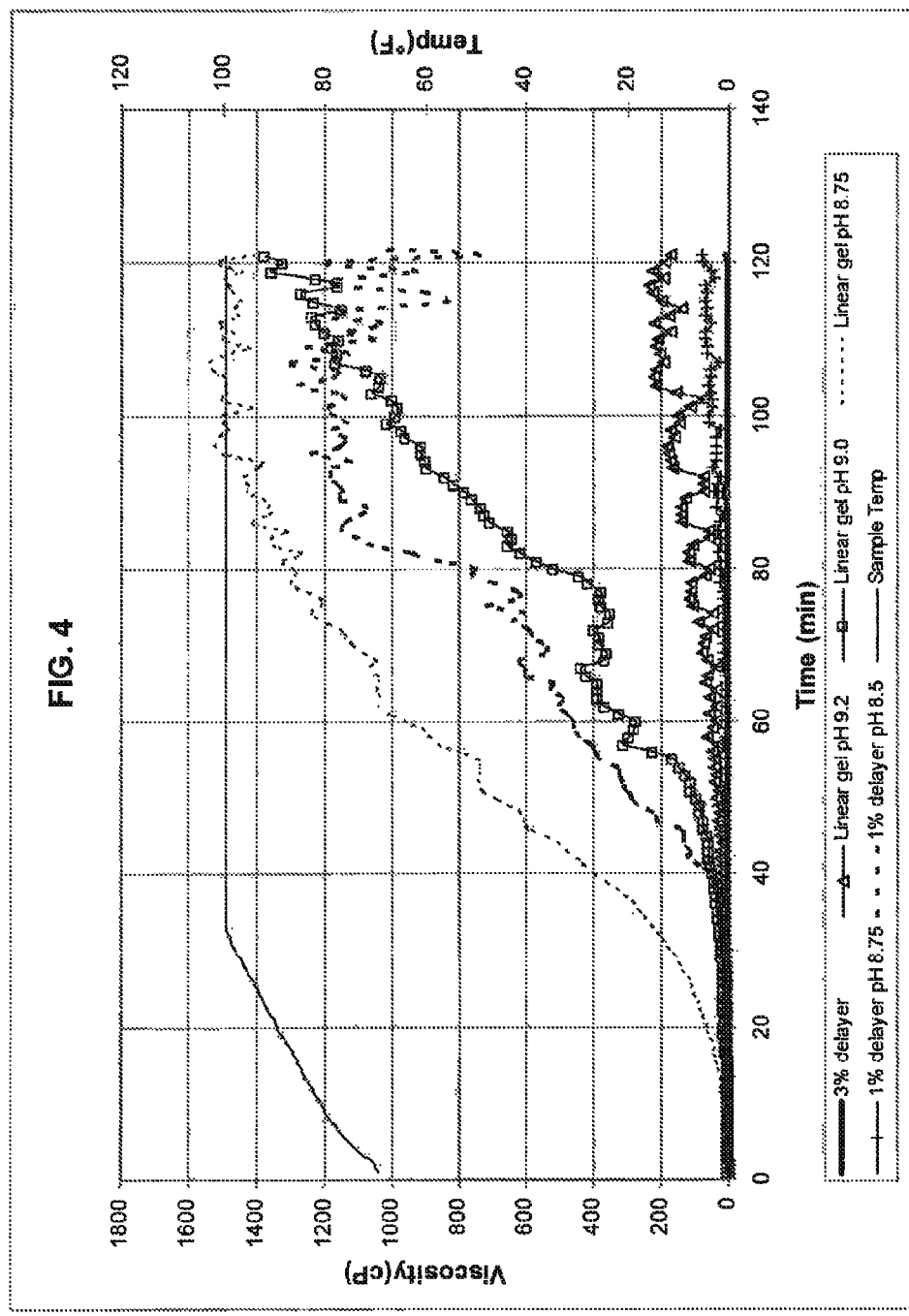
FIG. 4 illustrates the effect of varying levels of pH with a delayer on the start of gel hydration.
Figure 5:
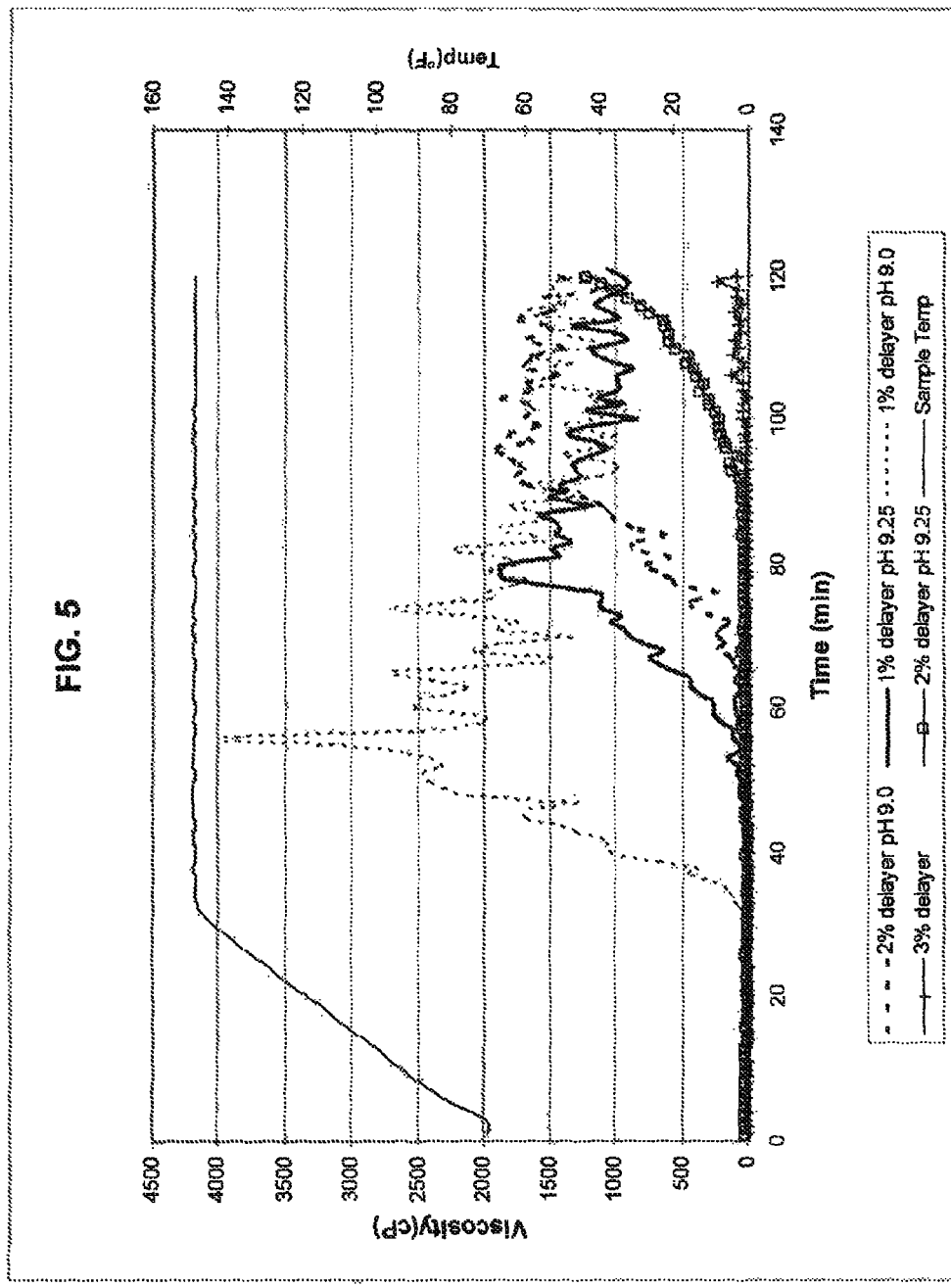
FIG. 5 illustrates the effect of varying levels of pH with a delayer on the start of gel hydration.

The effect of pH and delayer on hydration time was examined and the results are set forth in FIG. 4. For each test run, the gel was created using 100 ppt Polymer in water. This slurry had a pH of 8.84. The pH to lower values was obtained by adding acetic acid until pH values of 8.5 and 8.75 were obtained. The pH to higher levels was obtained by the addition of a sodium hydroxide solution (10% by weight in water) to pH values of 9 and 9.2. The slurry was loaded in to the viscometer and viscosity measured at a shear rate of 100 sec$^{-1}$. The temperature of the viscometer was ramped from 70° F. to 100° F. in 30 minutes and was then kept constant at 100° F. for an additional 90 minutes. In some of the runs, borax was added as a delayer. The results show that hydration time can be changed with changes in pH. Specifically:
  a. the gel at the natural pH of 8.84 and 3% borax by weight of Polymer showed little difference in hydration;
  b. the gel with no delayer and adjusted to a pH of 9.2 and the gel at pH 8.75 with 1% delayer showed no appreciable hydration; and
  c. the gel with no delayer and adjusted pH of 9.0; the gel with no delayer and adjusted pH of 8.75; and the gel with 1% delayer and adjusted pH of 8.5 all showed a delay in hydration, but the onset of hydration (where viscosity starts to increase and reach an ultimate minimum 1000 cP viscosity) varied from 25 to 52 minutes.

Example 4

Using the above procedure, the effect of both pH and delayer on hydration time was examined. For each test run, the gel was created using 100 ppt Polymer in water. This slurry had a pH of 8.84. The pH was increased with sodium hydroxide solution (10% by weight in water) to 9 and 9.25. The slurry was loaded in to the viscometer and viscosity measured at a shear rate of 100 sec$^{-1}$. The temperature of the viscometer was ramped from 70° F. to 150° F. in 30 minutes and was then kept constant at 150° F. for an additional 90 minutes. The results show that hydration time can be changed with changes in both delayer concentration and pH. Specifically, the onset of hydration time varied from 35 minutes to 90 minutes, a greater variation than was shown in Example 3.

Example 5

Figure 6:
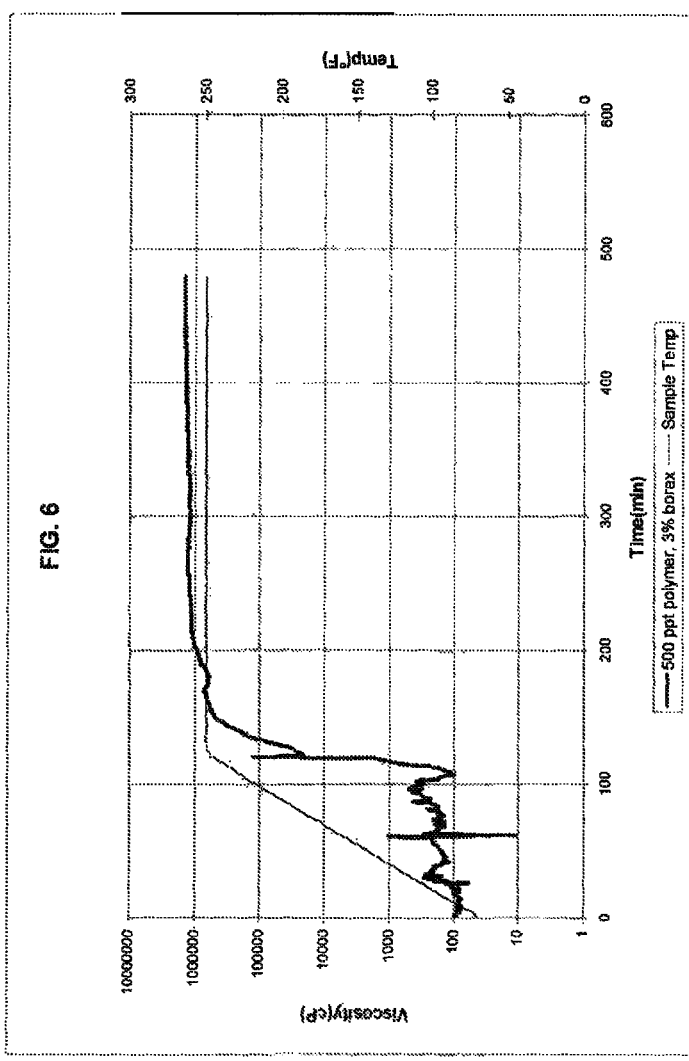
FIG. 6 illustrates the ability of the gel to maintain high viscosity under low shear conditions for isolation.

Using the above procedure, the optimum result of the above examples (3% borax and pH of 9.65) was further examined to determine if high viscosity for isolation could be achieved. The results are set forth in FIG. 6. For this test, the gel was created using 500 ppt Polymer in water, 10% sodium hydroxide solution to adjust the pH and borax to act as a delayer. The slurry was loaded in to the viscometer and viscosity measured at a shear rate of 100 sec$^{-1}$. The temperature of the viscometer was ramped from 70° F. to 250°

F. in two hours and was then kept constant at 250° F. for an additional 6 hours. In this test the constant shear was reduced from 100 sec$^{-1}$ to 0.1 sec-1 after the initial two hour ramp (to simulate static conditions of the blocking gel after placement). This test shows that at low shear conditions the result is a viscosity of over a million cP.

Example 6

The ability of a gel to be pumped into a horizontal position and to be held at differential pressure was determined by use of two high pressure fluid loss cells (about eight inches in length and two inches in diameter), one positioned horizontally and one vertically. These cells were positioned as illustrated in FIG. 7. The horizontal cell 50, which will contain the temporary blocking gel, has the addition of either a slotted insert 60a or a <1 and ceramic core 60b at the end 70 of the cell. The slotted insert simulates a formation with perforation. The ceramic core simulates formation without perforation. Unless specifically stated in the example, the default is the slotted insert. When desired, jack 65 was used to raise or lower the horizontal cell to a desired angle. Tubing 75 connected the bottom of vertical cell 55 with the side of horizontal cell 50. Tubing 75 simulates the heel of the wellbore. A heater was placed around the horizontal cell to heat and control temperature. A temperature ramp was used to elevate the temperature of the gel in the horizontal cell. The gel was pumped from the vertical cell 55 to the horizontal cell as a slurry in tap water via tubing and pressured to 100 psi. After pumping the gel into horizontal cell 50 and allowing a two hour residence time at temperature to crosslink the gel, vertical cell 55 was filled with dyed tap water. Additional pressure was then applied to the top of the vertical cell and the volume of water lost from the vertical cell to the horizontal cell was used as the measure of isolation. In addition, the amount of gel extruded through the slotted insert was also measured.

Example 7

Example 7 illustrates the ability of the well treatment fluid of the invention to act as a block for a period of time at pressure duplicating formation with no perforation. The test procedure was to create a composition of the gel used in Example 5 (500 ppt Polymer and water with 3% borax by weight of Polymer buffered to a pH of 9.65 with the addition of 10% sodium hydroxide solution). The protocol was the same as with Example 6 with the exception of a <1MD ceramic core was used. The gel was pumped from the vertical cell to the horizontal cell and allowed to heat up to 250 F for two hours at 100 psi to crosslink the gel. The vertical cell was filled with dyed tap water. Additional pressure to 500 psi for one hour was then applied to the top of the vertical cell. There was no water breakthrough after the initial hour showing good isolation. The cell was shut in overnight at 500 psi pressure and opened again the next morning. Again, there was no water breakthrough. The pressure was again increased in 100 psi increments to 1000 psi. Each pressure was maintained for 5 minutes to observe any water break through before going to the next level. At 1000 psi differential pressure, the cell was monitored for 6 hours without any water break through. The cell was again shut in at the temperature and pressure condition overnight. The cell was opened the next morning and observed for a total of 24 hours at 1000 psi without any water break through. This Example illustrates that the gel has the ability to be a blocking agent.

Example 8

Example 8 illustrates the ability to pump a stimulation fluid through the blocking gel in a formation with perforation. The test procedure was to create a composition of the gel used in Example 5 (500 ppt Polymer and water with 3% borax by weight of Polymer buffered to a pH of 9.65 with the addition of 10% sodium hydroxide solution). The protocol was the same as Example 6 with the slotted insert simulating perforation. The gel was pumped from the vertical cell to the horizontal cell and allowed to heat up to 250 F for two hours at 100 psi to crosslink the gel. The vertical cell was filled with dyed tap water. When pressure was increased, there was water breakthrough at 125 psi—a water channel was created through the gel near the center of the gel pack. This example indicates that a stimulation fluid can be successfully pumped through the blocking gel to a formation with a perforation.

Example 9

A series of tests was designed to evaluate how to break the gel, once its utility as a blocker was over. The results are set forth in Tables 1 and 2. These tests used two different breakers in various concentrations. The test procedure was to create a composition of the gel used in Example 5 (500 ppt Polymer and water with 3% borax by weight of Polymer buffered to a pH of 9.65 with the addition of 10% sodium hydroxide solution). The breakers as described in the tables 1 and 2 were added to the gels. 400 mL of the gels were then placed in the horizontal fluid loss cell as described before and heated to indicated temperature at 1000 psi. The cells were opened periodically to see if the gels were broken. Table 1 shows results using the GBW-25, as breaker, and Table 2 shows results using the breaker High Perm CRB (encapsulated ammonium persulfate)

TABLE 1

GBW-25 as a Breaker

| Temperature | 250° F. | 250° F. | 250° F. | 250° F. |
|---|---|---|---|---|
| Concentration | 50 ppt | 25 ppt | 25 ppt | 10 ppt |
| Time | 18 hours | 18 hours | 48 hours | 24 hours |
| Result | Fully Broken | 250 mls of 400 mls broken | Most of the structure gone, viscosity reduced | 100 mls of 400 mls broken |

TABLE 2

High Perm CRB as a Breaker

| Temperature | 150° F. | 150° F. | 150° F. | 150° F. |
|---|---|---|---|---|
| Concentration | 10 ppt | 20 ppt | 30 ppt | 50 ppt |
| Time | 24 hours | 48 hours | 24 hours | 24 hours |
| Result | Beginning to break | Most of the structure gone, viscosity reduced | Fully Broken | Fully Broken |

These results show that the gel can be broken and that the time to brake is variable, providing more flexibility to the invention.

From the foregoing, it will be observed that numerous variations and modifications may be effected without departing from the true spirit and scope of the novel concepts of the invention.

What is claimed is:

1. A method of re-fracturing a subterranean formation penetrated by a well having multiple zones, the method comprising:
   (a) subjecting a productive zone within the subterranean formation to hydraulic fracturing;
   (b) isolating the fractured productive zone from a second zone in the well by (i) pumping into the well a treatment fluid comprising an unhydrated borated galactomannan gum and a crosslinking agent, wherein the unhydrated borated galactomannan gum prior to being crosslinked contains borate ions; (ii) forming a gelled temporary seal by reacting the unhydrated borated galactomannan gum with the crosslinking agent and thereby isolating the fractured productive zone from the second zone;
   (c) degrading the gelled temporary seal between the isolated fractured productive zone and the second zone by pumping into the well a viscosity reducing agent and reducing the viscosity of the gelled temporary seal with the viscosity reducing agent, wherein the viscosity reducing agent is pumped into the well at a pressure insufficient to create or enlarge a fracture within the subterranean formation; and
   (d) re-fracturing the isolated fractured productive zone after degradation of the gelled temporary seal by pumping into the well a fracturing fluid at a pressure sufficient to create or enlarge a fracture within the isolated fractured productive zone.

2. The method of claim 1, further comprising:
   (e) pumping into the well near the re-fractured isolated fractured productive zone of the well a well treatment fluid comprising an unhydrated borated galactomannan gum and a crosslinking agent, wherein the unhydrated borated galactomannan gum prior to being crosslinked contains borate ions; and
   (f) isolating the re-fractured isolated fractured productive zone from another zone of the well by hardening the well treatment fluid of step (e).

3. The method of claim 2, wherein steps (a) through (f) are repeated at least once.

4. The method of claim 1, wherein the well is a vertical well.

5. The method of claim 1, wherein the viscosity reducing agent is an acid.

6. The method of claim 5, wherein the acid is selected from the group consisting of hydrochloric acid, formic acid, sulfamic acid or a mixture thereof.

7. The method of claim 1, wherein the viscosity reducing agent is an oxidative breaker or an enzyme breaker or a combination thereof.

8. The method of claim 7, wherein the viscosity reducing agent is selected from the group consisting of alkaline earth metal peroxides, metal peroxides, organic peroxides, hydrochlorite bleaches, persulfate salts, chromous salts, sodium bromate, sodium perchlorate, sodium perborate, magnesium perborate, calcium perborate and galactomannans and mixtures thereof.

9. The method of claim 1, wherein the subterranean formation is shale.

10. The method of claim 1, wherein the well is a horizontal well.

11. A method of fracturing a subterranean formation penetrated by a well comprising:
    (a) pumping into the well an unhydrated borated galactomannan gum and a crosslinking agent;
    (b) sealing a fractured productive zone from another zone in the well with a temporary blocking gel by reacting the borated galactomannan gum and crosslinking agent to form the temporary blocking gel from the reaction product;
    (c) pumping into the well a viscosity reducing agent, reducing the viscosity of the temporary blocking gel, unsealing the fractured productive zone from the another zone and removing the temporary blocking gel from the well, wherein the viscosity reducing agent is pumped into the well at a pressure not sufficient to create or enlarge a fracture within the subterranean formation; and
    (d) re-fracturing the unsealed fractured productive zone by subjecting the unsealed fractured productive zone to hydraulic fracturing by introducing into the unsealed fractured productive zone a fracturing fluid at a pressure sufficient to create or enlarge a fracture; and
    (e) pumping unhydrated borated galactomannan gum and crosslinking agent into the well and forming a temporary blocking gel between the re-fractured zone and the another zone by reacting the unhydrated borated galactomannan gum and crosslinking agent.

12. The method of claim 11, further comprising repeating steps (a) through (e) in one or more productive zones of the well.

13. The method of claim 11, wherein the well is a vertical well.

14. The method of claim 11, wherein the viscosity reducing agent is an acid.

15. The method of claim 11, wherein the viscosity reducing agent is an oxidative breaker or an enzyme breaker or a combination thereof.

16. A method of enhancing the productivity of a hydrocarbon-bearing formation penetrated by a well having multiple productive zones comprising:
    (a) forming a temporary blocking gel between a previously fractured productive zone and another zone by pumping into the well an unhydrated borated galactomannan gum and a delayed crosslinking agent and reacting the unhydrated borated galactomannan gum and delayed crosslinking agent;
    (b) pumping a viscosity reducing agent into the well, reducing the viscosity of the temporary blocking gel and then removing the temporary blocking agent from the well;
    (c) pumping into the well a fracturing fluid at a pressure sufficient to initiate or enlarge a fracture within the subterranean formation and re-fracturing the previously fractured productive zone; and
    (d) pumping into the well a well treatment fluid comprising unhydrated borated galactomannan gum and delayed crosslinking agent; and
    (e) isolating the re-fractured productive zone by hardening the well treatment fluid comprising the unhydrated borated galactomannan gum and delayed crosslinking agent.

17. The method of claim 16, wherein the well is a vertical well.

18. The method of claim 16, wherein the viscosity reducing agent is an acid or a breaker or a combination thereof.

19. The method of claim 16, wherein the subterranean formation is a shale formation.

20. The method of claim 16, wherein the well is a horizontal well.

* * * * *